(12) United States Patent
Tsukasaki et al.

(10) Patent No.: US 10,310,205 B2
(45) Date of Patent: Jun. 4, 2019

(54) ELECTRONIC APPARATUS AND RESTRICTION PART

(71) Applicant: FUJITSU CLIENT COMPUTING LIMITED, Kawasaki-shi (JP)

(72) Inventors: Haruka Tsukasaki, Kawasaki (JP); Yutaka Sato, Kawasaki (JP); Shinya Matsushita, Yokohama (JP)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 15/689,152

(22) Filed: Aug. 29, 2017

(65) Prior Publication Data

US 2018/0081138 A1 Mar. 22, 2018

(30) Foreign Application Priority Data

Sep. 21, 2016 (JP) .................................. 2016-184643

(51) Int. Cl.
*H05K 5/00* (2006.01)
*G02B 6/44* (2006.01)
*G06F 1/16* (2006.01)
*H04M 1/02* (2006.01)

(52) U.S. Cl.
CPC ......... *G02B 6/4452* (2013.01); *G02B 6/4453* (2013.01); *G06F 1/1622* (2013.01); *G06F 1/1624* (2013.01); *G06F 1/1677* (2013.01); *G06F 1/1688* (2013.01); *G06F 1/1616* (2013.01); *H04M 1/0225* (2013.01); *H04M 1/0235* (2013.01)

(58) Field of Classification Search
CPC ........................................................ G06F 1/16
USPC ..................................................... 361/679.01
See application file for complete search history.

(56) References Cited

U.S. PATENT DOCUMENTS 5,590,024 A * 12/1996 Honda .................. G06F 1/1616
361/679.32
2007/0242420 A1 10/2007 Hoshino et al.
2010/0246120 A1 9/2010 Yada et al.

FOREIGN PATENT DOCUMENTS

JP 2010-239601 A 10/2010
JP 2012-174942 A 9/2012
WO 2006/061893 A1 6/2006

* cited by examiner

*Primary Examiner* — Jerry Wu
(74) *Attorney, Agent, or Firm* — Harness, Dickey & Pierce, P.L.C.

(57) ABSTRACT

An electronic apparatus includes: a hosing including a first facing wall portion and a second facing wall portion which face each other; a cable provided in the housing; and a restriction portion, provided between the first facing wall portion and the second facing wall portion, configured to restrict the first facing wall portion and the second facing wall portion to approach with each other and to retain the cable.

14 Claims, 8 Drawing Sheets

ELECTRONIC APPARATUS AND RESTRICTION PART

CROSS-REFERENCE TO RELATED APPLICATION

This application is based upon and claims the benefit of priority of the prior Japanese Patent Application No. 2016-184643, filed on Sep. 21, 2016, the entire contents of which are incorporated herein by reference.

FIELD

The embodiments discussed herein are related to an electronic apparatus and a restriction part.

BACKGROUND

Provided is an electronic apparatus including a cable retaining portion.

International Publication Pamphlet No. WO 2006/061893 or Japanese Laid-open Patent Publication No. 2012-174942 discusses related techniques.

SUMMARY

According to an aspect of the embodiments, an electronic apparatus includes: a hosing including a first facing wall portion and a second facing wall portion which face each other; a cable provided in the housing; and a restriction portion, provided between the first facing wall portion and the second facing wall portion, configured to restrict the first facing wall portion and the second facing wall portion to approach with each other and to retain the cable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, a cable retaining portion included in an electronic apparatus retains a cable having an excess length portion.

For example, in the electronic apparatus, the cable having the excess length portion is retained by the cable retaining portion, and is thus inhibited from being displaced. This increases ease of assembling work for the electronic apparatus.

However, when the electronic apparatus is provided with the cable retaining portion, for example, the number of parts included in the electronic apparatus may increase.

Figure 1:
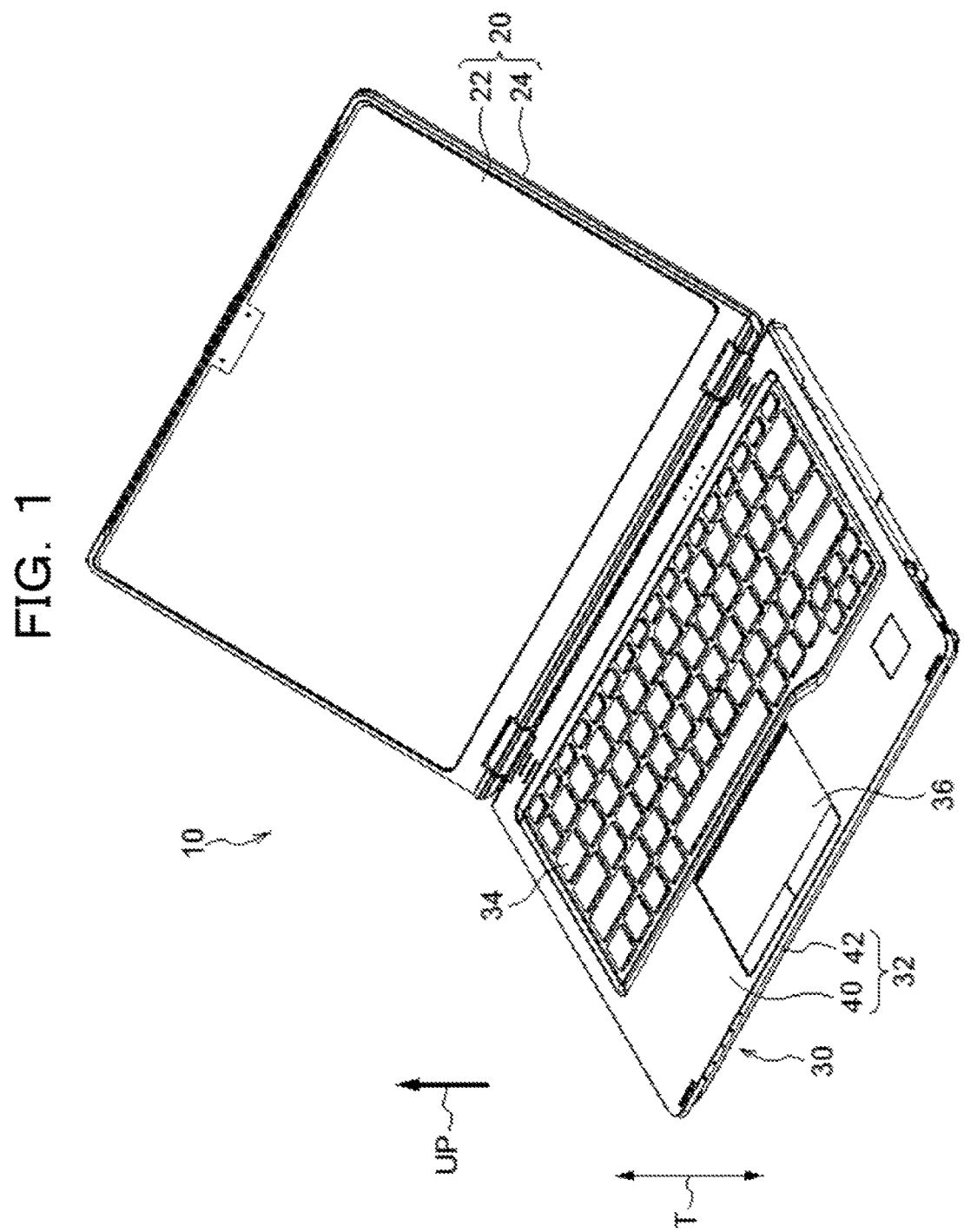
FIG. 1 illustrates an example of a perspective view of an electronic apparatus including a main unit.

FIG. 1 illustrates an example of a perspective view of the electronic apparatus including a main unit. As illustrated in FIG. 1, the electronic apparatus 10 may be a note-type personal computer, for example. The electronic apparatus 10 includes a display unit 20 and a main unit 30. The display unit 20 is turnably connected to an end portion, for example, a rear end portion of the main unit 30.

The display unit 20 includes a display 22 and a housing 24. The display 22 may include a liquid crystal panel, a touch panel or the like. The display 22 is housed in the housing 24. The housing 24 may be shaped like a flat box which covers the back surface of the display 22.

The main unit 30 includes a housing 32. The housing 32 may be shaped like a thin box. The upper surface of the housing 32 is provided with a key board 34, a touch pad 36 and the like. An arrow UP illustrated in FIGS. 1, 2, 4, 5, 6, and 8 is pointing upward in a height direction (thickness direction) of the main unit 30. The main unit 30 may be an example of the electronic apparatus.

Figure 2:
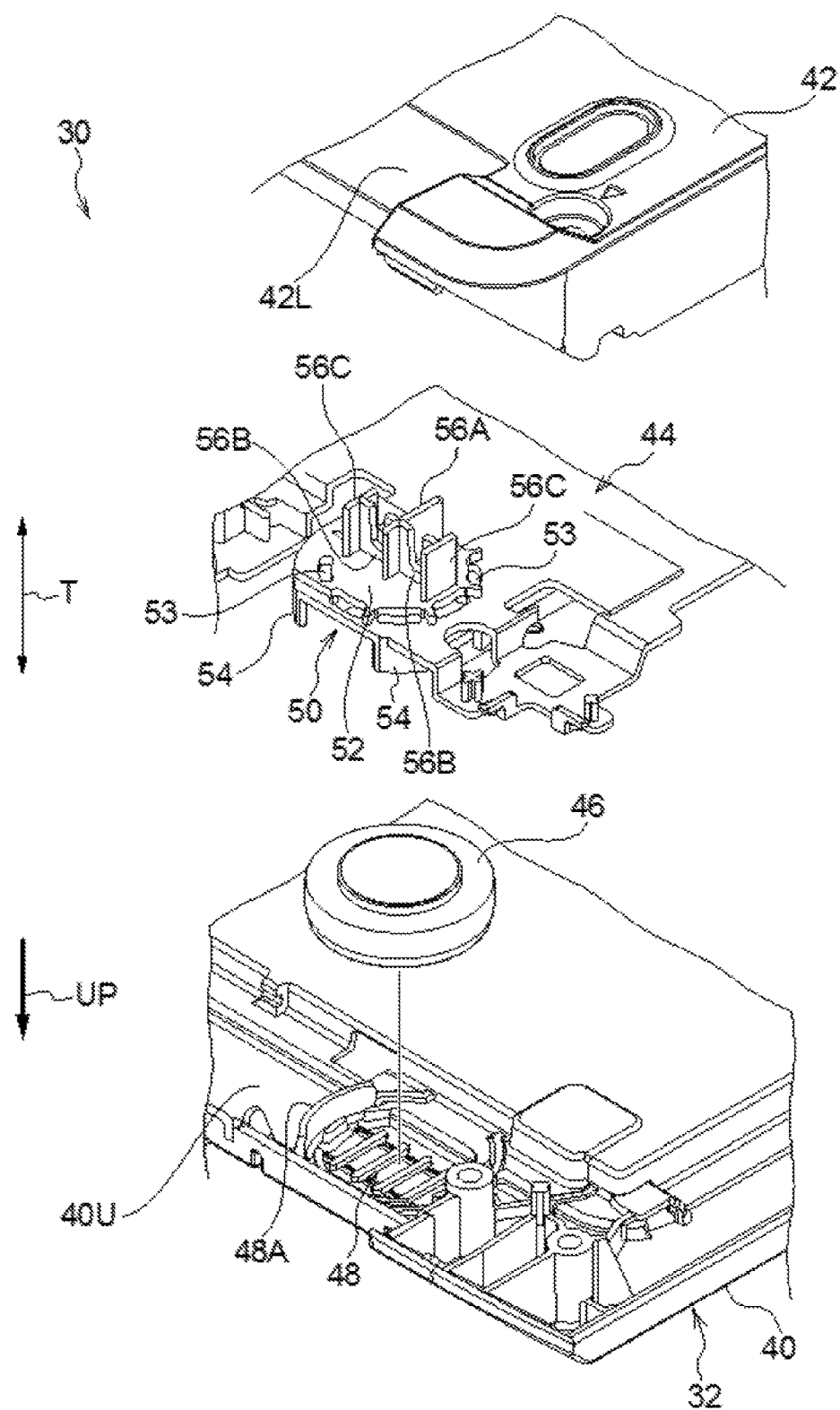
FIG. 2 illustrates an example of an exploded perspective view of the main unit.

FIG. 2 illustrates an example of an exploded perspective view of the main unit. The main unit illustrated in FIG. 2 may be the main unit illustrated in FIG. 1. As illustrated in FIG. 2, the housing 32 includes an upper cover 40 and a lower cover 42. The upper cover 40 and the lower cover 42 are aligned in a thickness direction (arrow T direction) of the housing 32 to form the housing 32. The upper cover 40 includes a top wall portion 40U which forms the upper surface of the housing 32. The lower cover 42 includes a bottom wall portion 42L which forms the lower surface (bottom surface) of the housing 32.

The top wall portion 40U of the upper cover 40 and the bottom wall portion 42L of the lower cover 42 face each other in the thickness direction (arrow T direction) of the housing 32. The upper cover 40 may be an example of a first cover (first exterior cover). The top wall portion 40U of the upper cover 40 may be an example of a first facing wall portion. The lower cover 42 may be an example of a second cover (second exterior cover). The bottom wall portion 42L of the lower cover 42 may be an example of a second facing wall portion.

A base frame 44 is disposed between the top wall portion 40U of the upper cover 40 and the bottom wall portion 42L of the lower cover 42. The base frame 44 is shaped like a panel. The base frame 44 is disposed in between with its thickness direction aligned with a facing direction of the top wall portion 40U and the bottom wall portion 42L. The base frame 44 supports, for example, a printed circuit board (not illustrated).

The base frame 44 is provided with a speaker holder 50 for holding a speaker 46. The speaker holder 50 may be made of resin, for example. The speaker holder 50 includes a cover portion 52, a pair of holding pieces 54, and multiple support rib portions 56A, 56B, 56C. The speaker 46 may be an example of a part to be contained in the speaker holder 50. The speaker holder 50 may be an example of a restriction portion and an example of a restriction part.

The cover portion 52 is shaped like a plate. The cover portion 52 is disposed with its thickness direction aligned with the facing direction of the top wall portion 40U and the bottom wall portion 42L. The cover portion 52 is provided between the speaker 46 and the bottom wall portion 42L of the lower cover 42. The speaker 46 is covered with the cover portion 52 from the side facing the bottom wall portion 42L of the lower cover 42. Multiple openings 53 are formed in the cover portion 52.

The pair of holding pieces 54 extend from the cover portion 52 toward the top wall portion 40U of the upper cover 40. The speaker 46 is contained between the pair of holding pieces 54. The pair of holding pieces 54 include claw portions formed thereon. The engagement of the claw portions with the speaker 46 causes the speaker 46 to be held by the pair of holding pieces 54. The pair of holding pieces 54 are in contact with the top wall portion 40U of the upper cover 40.

The speaker 46 may be a device out of which sounds come. The speaker 46 is shaped like a disk. The speaker 46, as held by the speaker holder 50, is contained in a speaker container 48 provided on the top wall portion 40U of the upper cover 40. The speaker container 48 includes a rib portion 48A which surrounds the speaker 46. The speaker 46 is fitted into a space created by the rib portion 48A. Thereby, the speaker 46 is positioned with respect to the upper cover 40. The shape or size of the speaker 46 may be changed depending on the necessity.

Figure 3:
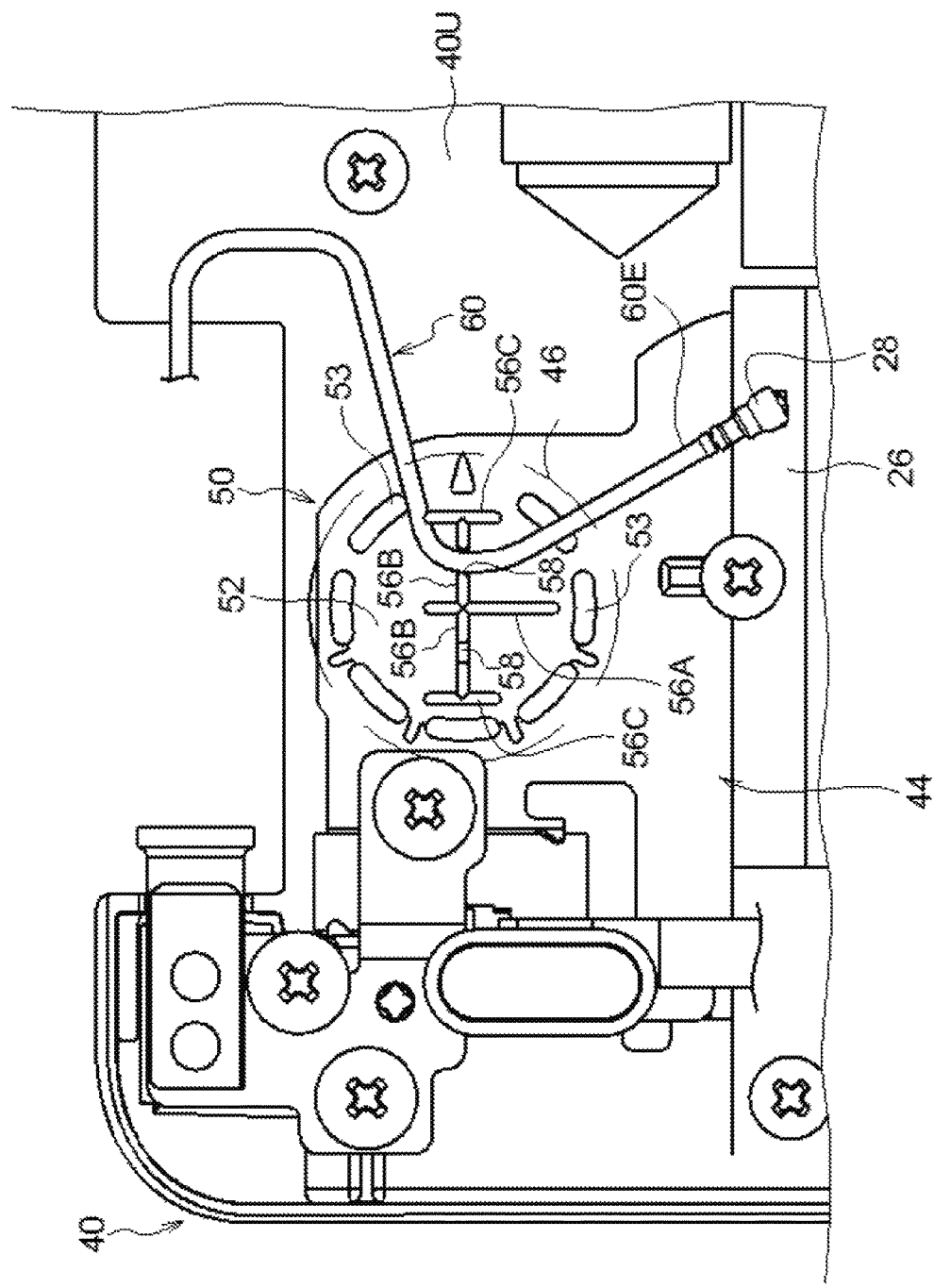
FIG. 3 illustrates an example of a bottom view of a speaker holder as looked at from under a lower cover.

The multiple support rib portions 56A, 56B, 56C extend from the cover portion 52 toward the bottom wall portion 42L of the lower cover 42. The support rib portions 56A, 56B, 56C are each shaped like a wall. FIG. 3 illustrates an example of a bottom view of the speaker holder as looked at from under the lower cover. The speaker holder illustrated in FIG. 3 may be the speaker holder illustrated in FIG. 2. As illustrated in FIG. 3, the multiple support rib portions 56A, 56B, 56C look to cross each other, when viewed in the thickness direction of the housing 32. The support rib portions 56C are respectively provided to the two end portions of the support rib portions 56B. The support rib portions 56A, 56B, 56C support the bottom wall portion 42L of the lower cover 42 at a distance from the cover portion 52.

Figure 4:
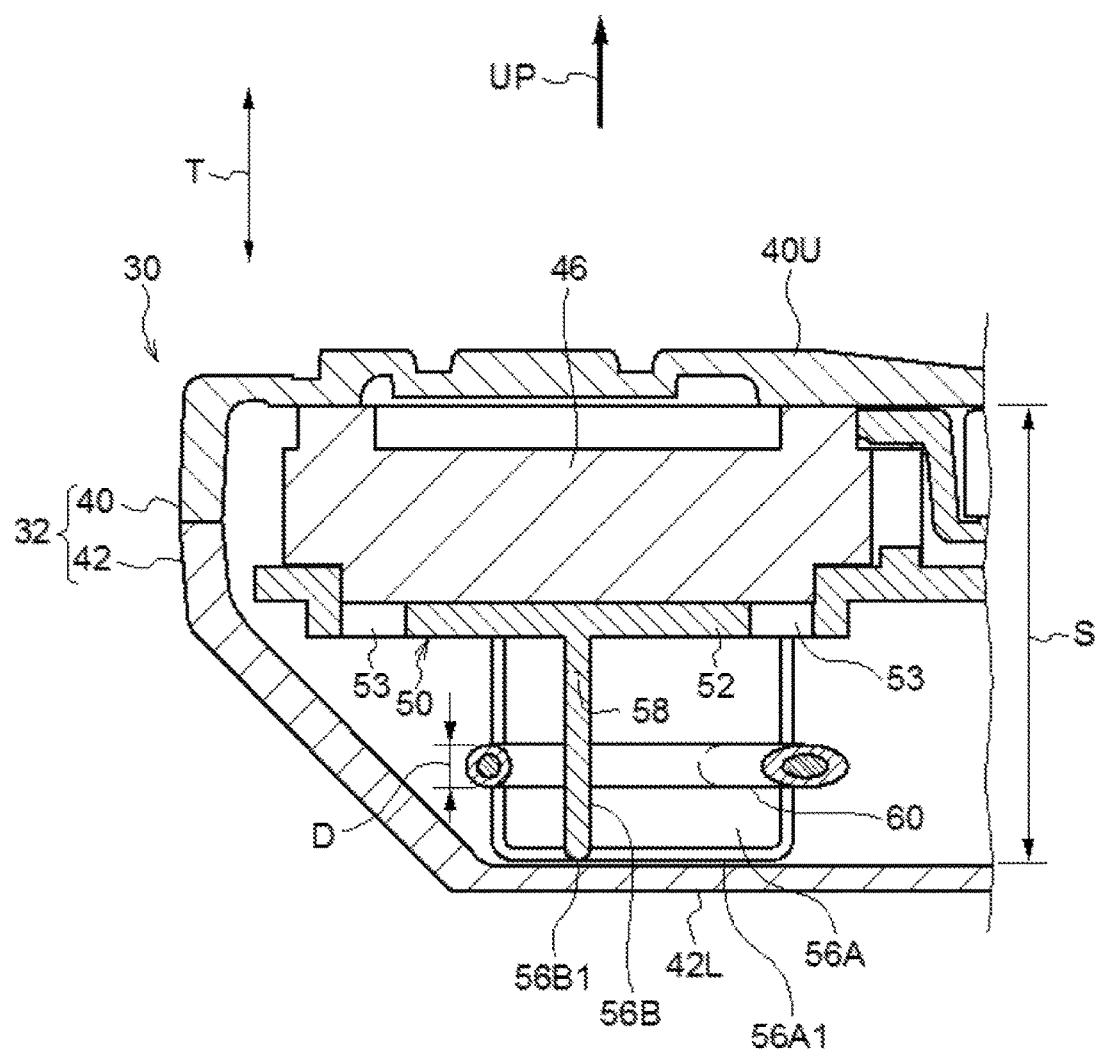
FIG. 4 illustrates an example of a cross-sectional view of the main unit taken in a thickness direction of a housing.

FIG. 4 illustrates an example of a cross-sectional view of the main unit taken in the thickness direction of the housing. The main unit illustrated in FIG. 4 may be the main unit illustrated in FIG. 2. As illustrated in FIG. 4, distal end portions 56A1, 56B1 of the respective support rib portions 56A, 56B, for example, are in contact with the bottom wall portion 42L of the lower cover 42. The top wall portion 40U of the upper cover 40 is supported by the bottom wall portion 42L of the lower cover 42 via the speaker holder 50, or via the speaker 46 and the speaker holder 50. The speaker holder 50 stops the top wall portion 40U of the upper cover 40 and the bottom wall portion 42L of the lower cover 42 from coming closer to each other. For example, the speaker holder 50 maintains a predetermined space S between the top wall portion 40U and the bottom wall portion 42L. For example, the speaker holder 50 stops the speaker 46 from moving (getting misaligned) toward the bottom wall portion 42L of the lower cover 42.

For example, as illustrated in FIG. 3, a cable 60 is housed in the housing 32 of the main unit 30. The cable 60 is laid extending between the display unit 20 and the main unit 30. One end portion 60E of the cable 60 is electrically connected to a to-be-installed unit 26, which is housed in the housing 32 of the main unit 30, using a connector 28. The opposite end portion of the cable 60 is connected to the display 22 or an antenna provided to the display unit 20, for example. The cable may be a communication cable, a power supply cable, a lead line or the like.

Figure 5:
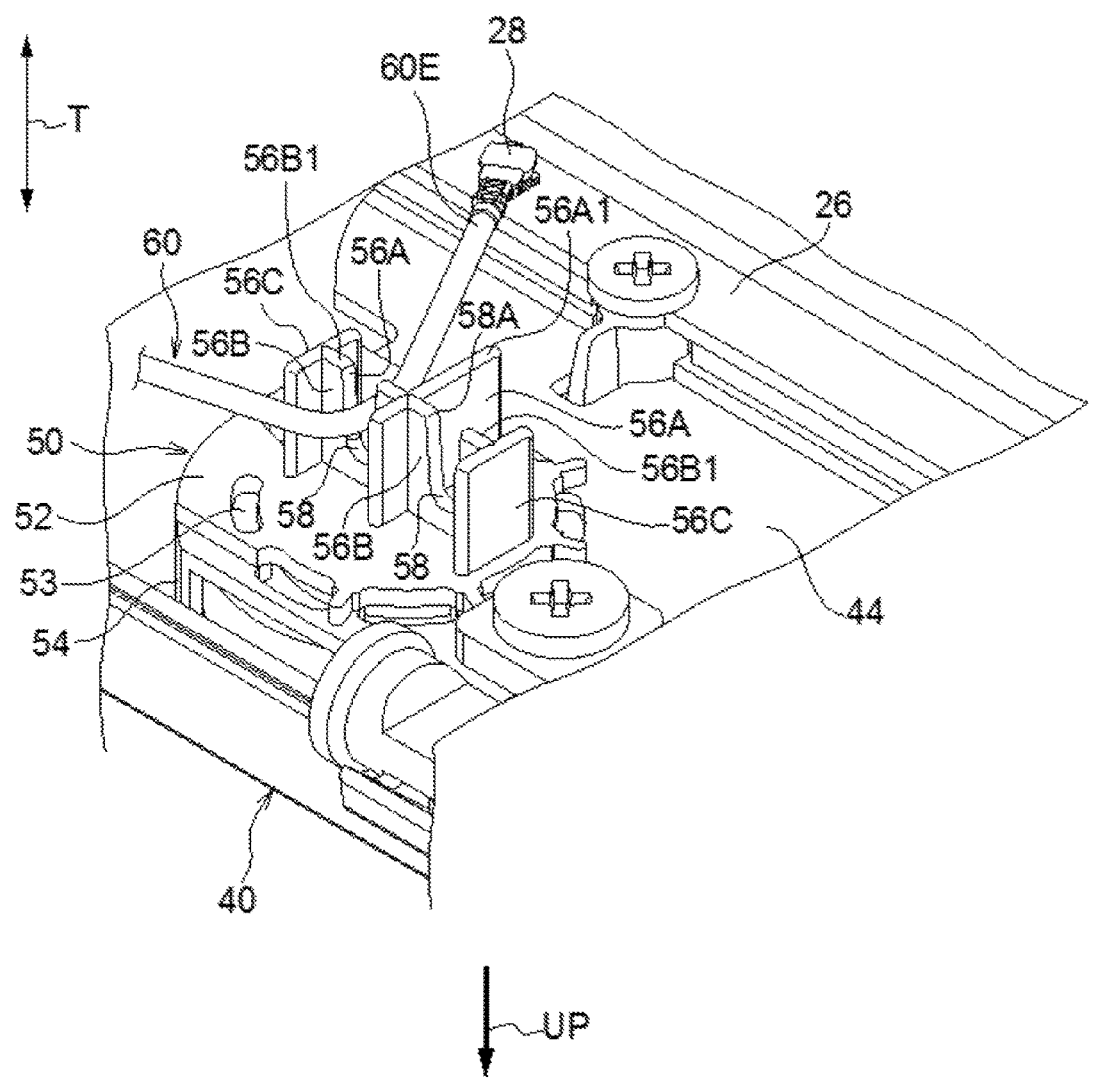
FIG. 5 illustrates an example of a perspective view of the speaker holder.

The cable 60 has an excess length portion with a predetermined length. The excess length portion of the cable 60 makes it easy to connect the one end portion 60E of the cable 60 to the connector 28. The cable 60 is laid out in the housing 32 while hooked to the speaker holder 50. FIG. 5 illustrates an example of a perspective view of the speaker holder. The speaker holder illustrated in FIG. 5 may be the speaker holder illustrated in FIG. 3. As illustrated in FIG. 5, a groove portion 58 is formed in each of the support rib portions 56B which are among the multiple support rib portions 56A, 56B, 56C.

The groove portion 58 is shaped like the letter U, and is opened on a side facing toward the bottom wall portion 42L of the lower cover 42 (see FIG. 2). The groove portion 58 includes an opening 58A, for example, facing toward the bottom wall portion 42L of the lower cover 42. The groove portion 58 penetrates through the support rib portion 56B in a thickness direction of the support rib portion 56B. The width (groove width) of the groove portion 58 may be wider than a diameter D of the cable 60 (see FIG. 4). A part of the cable 60 may be inserted into the groove portion 58 from the opening 58A. The groove portion 58 may be, for example, a wiring portion (wiring passage) in which the cable 60 is laid out. The support rib portion 56B may be an example of the hook portion.

When a part of the cable 60 is inserted into the groove portion 58, the cable 60 is retained by the support rib portion 56B. For example, when a part of the curved cable 60 is inserted into the groove portion 58, the cable 60 is retained by the support rib portion 56B while hooked to the support rib portion 56B. For example, the cable 60 is retained by the support rib portion 56B while wound around the support rib portion 56B. This may reduce a risk of displacement, lifting, or the like of the cable 60.

For example, the cable 60 is laid out in the housing 32 of the main unit 30. The cable 60 has the excess length portion with the predetermined length. For this reason, the worker may easily connect the one end portion 60E of the cable 60 to the connector 28 when assembling the main unit 30. Accordingly, the worker may lay out the cable 60 easily.

In the case where the cable 60 has the excess length portion, the cable 60 easily gets misaligned or lifted. In the case where the cable 60 gets misaligned or lifted, the misaligned cable 60 may get caught between the lower cover 42 and the upper cover 40 when the worker assembles the housing 32 of the main unit 30, and thus the cable 60 gets damaged. For example, when the worker installs a to-be-installed component in the housing 32 of the main unit 30, the misaligned cable 60 may interfere with the to-be-installed component and thus makes the to-be-installed component hard to install in the housing 32.

The cable 60 may be retained, for example, by the speaker holder 50. For example the groove portion 58 is formed in each of the support rib portions 56B of the speaker holder 50. A part of the cable 60 is inserted into the groove portion 58. Thereby, the cable 60 is retained by the support rib portion 56B. This may reduce a risk of displacement or lifting of the cable 60.

Accordingly, the cable 60 may be less likely to get caught between the lower cover 42 and the upper cover 40 when the worker assembles the housing 32 of the main unit 30. The cable 60 may be less likely to interfere with the to-be-installed component when the worker installs the to-be-installed component in the housing 32 of the main unit 30. This may enhance the assemblability of the main unit 30.

The speaker holder 50 exists between the bottom wall portion 42L of the lower cover 42 and the top wall portion 40U of the upper cover 40, and thus stops the bottom wall portion 42L and the top wall portion 40U from coming closer to each other. This may make the housing 32 of the main unit 30 less likely to collapse or do similar things. For example, the speaker holder 50 retains the cable 60. For example, the speaker holder 50 additionally serves the retaining function of retaining the cable 60.

This may make the number of parts in the main unit 30 smaller than in a case where a part specialized to retain the cable 60 is provided in the housing 32. Accordingly, the main unit 30 may be built light in weight or small in size. In addition, the number of steps performed to assemble the main unit 30 may be reduced.

As discussed above, it may be possible to stop the cable 60 from getting misaligned, for example, while decreasing the number of parts in the main unit 30.

The groove portion 58 of the support rib portion 56B includes the opening 58A facing toward the bottom wall portion 42L of the lower cover 42 (see FIG. 5). Thus, it is easy to insert a part of the cable 60 into the groove portion 58 from the opening 58A. Accordingly, the part of the cable 60 is easily hooked to the support rib portion 56B.

The speaker holder 50 holds the speaker 46. The speaker holder 50 holds the speaker 46, for example, using the pair of holding pieces 54. The speaker holder 50 holds the speaker 46 collaboratively with the top wall portion 40U of the upper cover 40. This may reduce a risk of displacing the speaker 46 relative to the housing 32.

The support rib portions 56A, 56B, 56C of the speaker holder 50 extend from the cover portion 52 toward the bottom wall portion 42L of the lower cover 42, and supports the bottom wall portion 42L at a distance from the cover portion 52. The support rib portions 56B may make the speaker 46 less likely to move toward the bottom wall portion 42L of the lower cover 42. The top wall portion 40U of the upper cover 40 is supported by the bottom wall portion 42L of the lower cover 42 with the assistance of the speaker holder 50. This may make the top wall portion 40U of the upper cover 40 less likely to bend or collapse.

Figure 6:
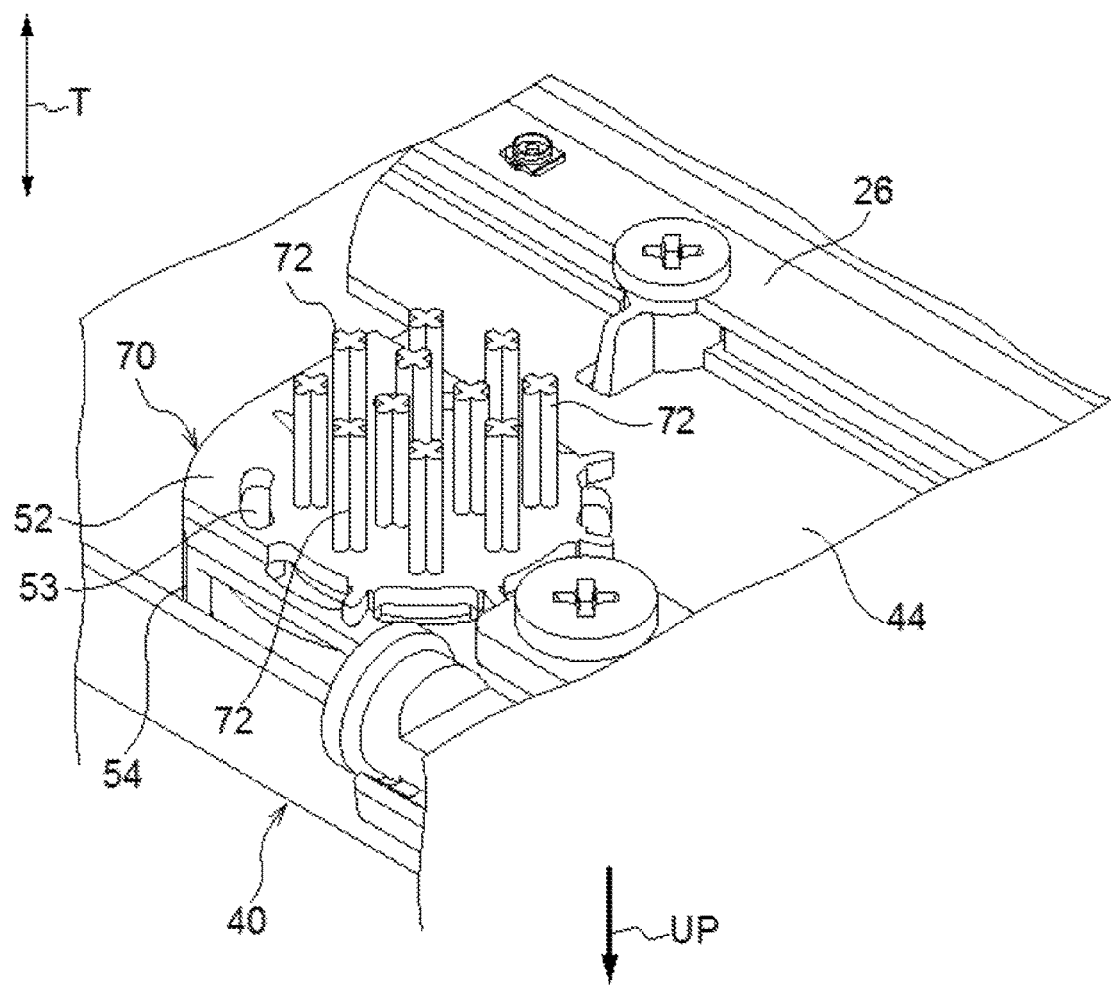
FIG. 6 illustrates another example of a perspective view of the speaker holder.

FIG. 6 illustrates another example of a perspective view of the speaker holder. FIG. 6 may correspond to FIG. 5. The speaker holder 70 illustrated in FIG. 6 includes the cover portion 52, the pair of holding pieces 54, and multiple pillar portions 72. The multiple pillar portions 72 extend from the cover portion 52 toward the bottom wall portion 42L (see FIG. 2) of the lower cover 42, and is in contact with the bottom wall portion 42L. The pillar portions 72 are disposed with their longitudinal direction aligned with the facing direction of the top wall portion 40U of the upper cover 40 and the bottom wall portion 42L of the lower cover 42 (the arrow T direction). The speaker holder 70 may be an example of the restriction portion and an example of a restriction part.

Figure 7:
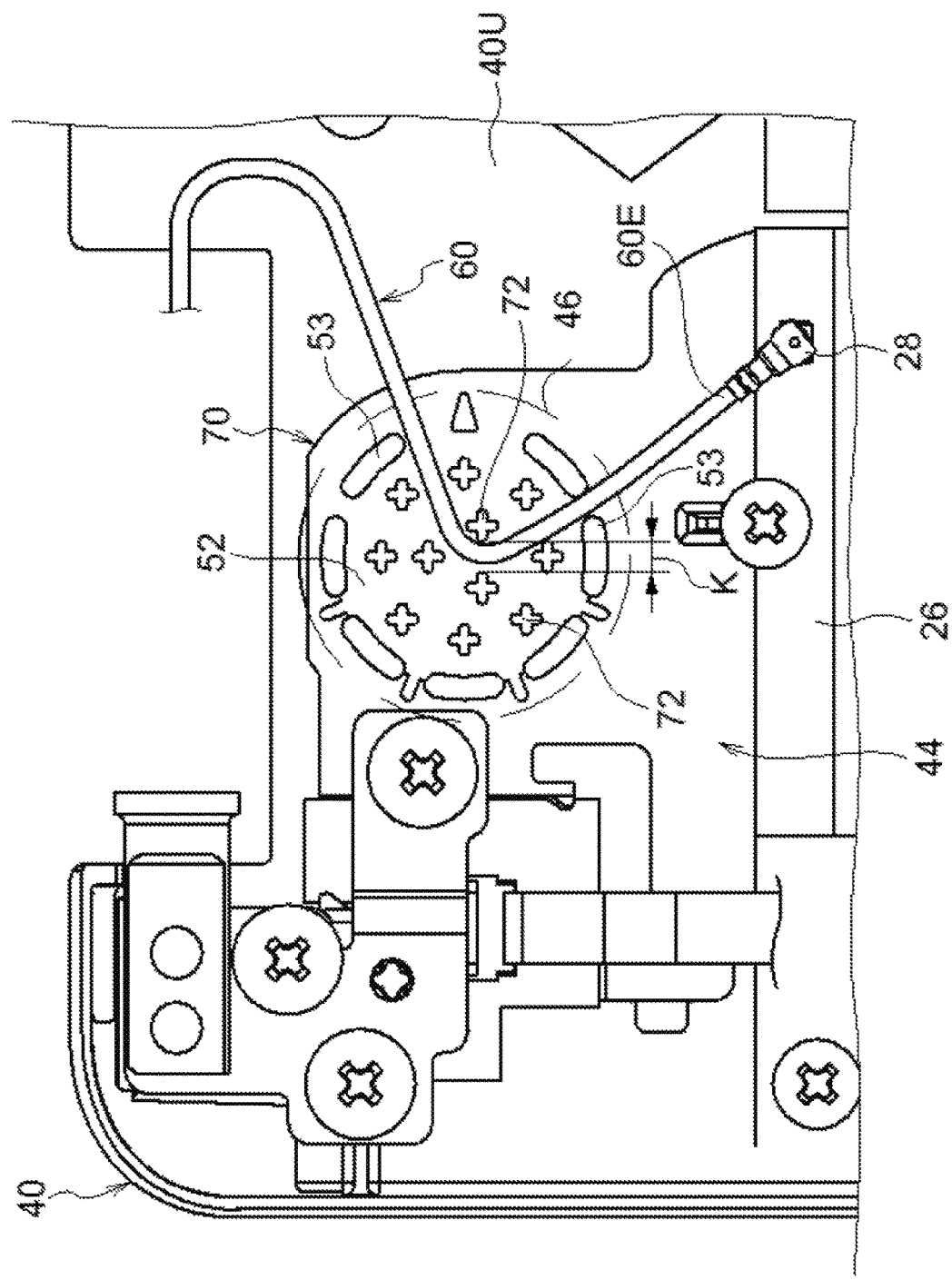
FIG. 7 illustrates an example of a bottom view of the speaker holder.

FIG. 7 illustrates an example of the speaker holder. FIG. 3 may correspond to FIG. 7. As illustrated in FIG. 3, each pillar portion 72 as viewed in its longitudinal direction is shaped like a cross. The multiple pillar portions 72 viewed in their longitudinal direction are spaced out from one another. A space K between each neighboring two of the pillar portions 72 is wider than the diameter D (see FIG. 4) of the cable 60. For this reason, a part of the cable 60 may be inserted between any neighboring two of the pillar portions 72. For example, an interstice between any neighboring two of the pillar portions 72 may be the wiring portion (wiring passage) in which the cable 60 is laid out. Any one of the pillar portions 72 may be an example of the hook portion.

When a part of the cable 60 is inserted between a pair of neighboring pillar portions 72, the cable 60 is retained by the pair of neighboring pillar portions 72. For example, when a part of the curved cable 60 is inserted between a pair of neighboring pillar portions 72, the cable 60 is retained by the pair of neighboring pillar portions 72 while hooked to the pillar portions 72. For example, the cable 60 is retained by the pair of neighboring pillar portions 72 while wound around the pillar portions 72. This may reduce a risk of displacement, lifting or the like of the cable 60.

The multiple pillar portions 72 are provided to the speaker holder 70. Thereby, the worker may select pillar portions 72 to which hook the cable 60 depending on the excess length portion of the cable 60. This may efficiently reduce a risk of displacement or the like of the cable 60.

The multiple pillar portions 72 supports the bottom wall portion 42L of the lower cover 42 at a distance from the cover portion 52. The pillar portions 72 may make the speaker 46 less likely to move (get misaligned) toward the bottom wall portion 42L of the lower cover 42. The top wall portion 40U of the upper cover 40 is supported by the bottom wall portion 42L of the lower cover 42 using the speaker holder 70. This may make the top wall portion 40U of the upper cover 40 less likely to bend or collapse.

The cable 60 is hooked to the support rib portions 56B. The cable 60 may be hooked to the support rib portions 56A, 56B, 56C.

In each support rib portion 56B, the opening 58A of the groove portion 58 is formed in the distal end portion 56B1. For example, in a case where a groove portion is formed in the support rib portion 56A (see FIG. 5), an opening of the groove portion may be formed in a side end portion (an end portion extending in the arrow T direction) of the support rib portion 56A. Instead of the groove portion 58, a through-hole which the cable 60 penetrates may be formed in each support rib portion 56B.

For example, the speaker holder 50 is disposed between the speaker 46 and the bottom wall portion 42L of the lower cover 42. For example, the speaker holder may be disposed between the top wall portion 40U of the upper cover 40 and the speaker 46. For example, the lower cover 42 may be an example of the first cover, and the bottom wall portion 42L of the lower cover 42 may be an example of the first facing wall portion. The upper cover 40 may be an example of the second cover, and the top wall portion 40U of the upper cover 40 may be an example of the second facing wall portion.

The speaker 46 may be a part to be contained in the holder. A part to be contained therein is not limited to the speaker 46, and may be other parts such as a cooling fan, a camera, an antenna, a battery (including a coin-shaped battery and the like), and a storage. The restriction part is not limited to the speaker holder 50, and may be a holder for retaining the above-mentioned parts to be contained.

Figure 8:
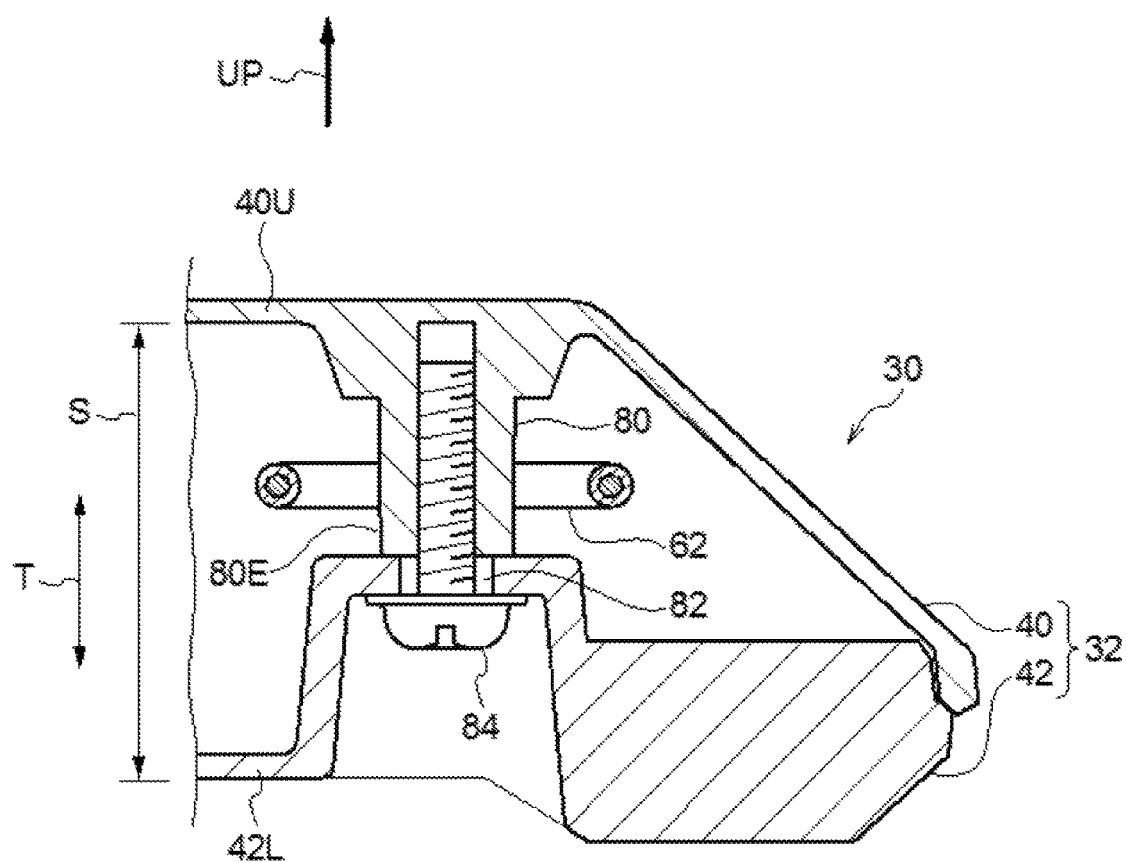
FIG. 8 illustrates another example of the cross-sectional view of the main unit taken in the thickness direction of the housing.

FIG. 8 illustrates another example of the cross-sectional view of the main unit taken in the thickness direction of the housing. In FIG. 8, members and the like having configurations which are substantially the same as or similar to those illustrated in FIGS. 1 to 7 will be denoted by the same reference sign, and descriptions for such members and the like may be omitted.

In the main unit 30 illustrated in FIG. 8, a boss portion 80 is provided to the top wall portion 40U of the upper cover 40. The boss portion 80 is shaped like a tube (a cylinder). An internal thread is formed in the inner peripheral surface of the boss portion 80. The boss portion 80 extends from the top wall portion 40U of the upper cover 40 toward the bottom wall portion 42L of the lower cover 42.

A distal end portion 80E of the boss portion 80 is in contact with the bottom wall portion 42L of the lower cover 42. The boss portion 80 supports the bottom wall portion 42L of the lower cover 42 at a distance from the top wall portion 40U of the upper cover 40. For example, the boss portion 80 may stop the top wall portion 40U of the upper cover 40 and the bottom wall portion 42L of the lower cover 42 from coming closer to each other. The boss portion 80 may be an example of a restriction portion and an example of a pillar portion.

A through-hole 82 is formed in the bottom wall portion 42L of the lower cover 42. A screw member 84 is inserted in the through-hole 82. The screw member 84 may be a screw, a bolt or the like, for example. The screw member 84 is screwed into the boss portion 80 via the through-hole 82. The lower cover 42 is fastened to the upper cover 40 by the screw member 84.

The boss portion 80 retains a cable 62 which is laid out in the housing 32. For example, the cable 62 is laid out around the boss portion 80. The cable 62 has an excess length portion with a predetermined length. While hooked to or wound around the boss portion 80, the cable 62 is retained by the boss portion 80. This may reduce a risk of displacement, lifting or the like of the cable 62. The boss portion 80 may be an example of the restriction portion and an example of the pillar portion.

As illustrated in FIG. 8, the cable 62 is laid out in the housing 32 of the main unit 32. The cable 62 has the excess length portion with the predetermined length. The cable 62 is retained by the boss portion 80. For example, the cable 62 is hooked to or wound around the boss portion 80. Thereby, the cable 62 is retained by the boss portion 80. This may reduce a risk of displacement, lifting, or the like of the cable 62.

The boss portion 80 is placed between the top wall portion 40U of the upper cover 40 and the bottom wall portion 42L of the lower cover 42, and stops the top wall portion 40U and the bottom wall portion 42L from coming closer to each other. This may make the housing 32 of the main unit 30 less likely to collapse or do similar things. The boss portion 80 retains the cable 62. For example, the boss portion 80 may additionally serve the retaining function of retaining the cable 62.

This makes the number of parts in the main unit 30 illustrated in FIG. 8 smaller than in a case where a part specialized to retain the cable 62 is provided in the housing 32. Accordingly, the main unit 30 may be built light in weight or small in size. For example, the number of steps performed to assemble the main unit 30 may be reduced.

As discussed above, it may be possible to stop the cable 62 from getting misaligned while decreasing the number of parts in the main unit 30.

For example, the through-hole 82 is formed in the bottom wall portion 42L of the lower cover 42. The screw member 84 is screwed into the boss portion 80 via the through-hole 82. Thereby, the lower cover 42 is fixed to the upper cover 40. For example, the boss portion 80 may additionally serve the fixing function of fixing the lower cover 42 to the upper cover 40. This makes the number of parts in the main unit 30 much smaller.

In FIG. 8, the boss portion 80 is provided to the top wall portion 40U of the upper cover 40. The boss portion 80 may be instead provided to the bottom wall portion 42L of the lower cover 42, for example. In this case, the lower cover 42 may be an example of the first cover, and the bottom wall portion 42L of the lower cover 42 may be an example of the first facing wall portion. The upper cover 40 may be an example of the second cover, and the top wall portion 40U of the upper cover 40 may be an example of the second facing wall portion.

The cable 62 illustrated in FIG. 8 is hooked to or wound around the boss portion 80. The cable 62 may be instead wound around the boss portion 80 several times, for example. Similarly, the cable 60 illustrated in FIG. 3 may be instead wound around either of the support rib portions 56B several times, for example.

The cable 62 illustrated in FIG. 8 may be hooked to or wound around the pillar portion supporting the top wall portion 40U of the upper cover 40 after extending from the bottom wall portion 42L of the lower cover 42. In this case, the cable 62 is retained by the pillar portion.

The cable 62 illustrated in FIG. 8 may be hooked to or wound around a wall-shaped or rib-shaped hook portion supporting the top wall portion 40U of the upper cover 40 after extending from the bottom wall portion 42L of the lower cover 42. In this case, the cable 62 is retained by the hook portion.

The top wall portion 40U of the upper cover 40 as an example of the first facing wall portion and the bottom wall portion 42L of the lower cover 42 as an example of the second facing wall portion face each other in the thickness direction of the housing 32. The first facing wall portion and the second facing wall portion may face each other in a width direction of the housing 32.

The above-discussed technique may be applied to not only the housing 32 of the main unit 30, but also a housing of an electronic apparatus such as a cellular phone or a tablet terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
    a housing including a first facing wall portion and a second facing wall portion which face each other;
    a cable provided in the housing;
    a cover portion disposed between the first facing wall portion and the second facing wall portion, a thickness direction of the cover portion aligning with a facing direction of the first facing wall portion and the second facing wall portion,
    a pair of holding pieces extending from the cover portion toward the first facing wall portion, and being configured to hold a speaker; and
    a support rib portion extending from the cover portion toward the second facing wall portion, and being configured to hold the cable,
    wherein the pair of holding pieces contact the first facing wall portion, and the support rib portion contacts the second facing wall portion.

2. The electronic apparatus according to claim 1, wherein the support rib portion includes a hook portion to be hooked to the cable.

3. The electronic apparatus according to claim 2, wherein the hook portion is provided between the second facing wall portion and the speaker, the hook portion restricting the second facing wall portion to approach.

4. The electronic apparatus according to claim 2, wherein the hook portion includes a groove portion allowing the cable to pass.

5. The electronic apparatus according to claim 4, wherein the groove portion includes an opening facing toward the second facing wall portion.

6. The electronic apparatus according to claim 2, wherein the hook portion includes a pillar portion whose longitudinal direction is aligned with a facing direction of the first facing wall portion and the second facing wall portion.

7. The electronic apparatus according to claim 6, wherein a plurality of the pillar portions are spaced out from one another as the pillar portion.

8. The electronic apparatus according to claim 7, wherein the cable is disposed between a pair of adjacent pillar portions.

9. The electronic apparatus according to claim 1, wherein the first facing wall portion and the second facing wall portion face each other in a thickness direction of the housing.

10. The electronic apparatus according to claim 1, wherein
the housing includes a first cover and a second cover which form the housing in a state that the first cover and the second cover are joined together in a thickness direction of the housing,
the first cover includes the first facing wall portion, and the second cover includes the second facing wall portion.

11. A support rib portion provided to an electronic apparatus, the electronic apparatus comprising:
a housing including a first facing wall portion and a second facing wall portion which face each other;
a cable provided in the housing, and
a cover portion disposed between the first facing wall portion and the second facing wall portion, a thickness direction of the cover portion aligning with a facing direction of the first facing wall portion and the second facing wall portion,
wherein the support rib portion is provided between the cover portion and the second facing wall portion, restricts the cover portion and the second facing wall portion to come closer to each other, and retains the cable; and
a pair of holding pieces extending from the cover portion toward the first facing wall portion, and being configured to hold a speaker, the pair of holding pieces contacting the first facing wall portion, and the support rib portion contacting the second facing wall portion.

12. The electronic apparatus according to claim 1,
wherein the support rib portion has a first support rib portion, a second first support rib portion and a third first support rib portion,
the first support rib portion and the second first support rib portion cross each other when viewed in a thickness direction of the housing,
the third support rib portion is respectively provided to the two end portions of the second support rib portion, and
the first support rib portion, the second first support rib portion and the third first support rib portion support the second facing wall portion with respect to the cover portion.

13. The electronic apparatus according to claim 12,
wherein the second support rib portion has a through-hole configured to be penetrated by the cable.

14. The electronic apparatus according to claim 1,
wherein the support rib portion has pillar portions extended from the cover portion toward the second facing wall portion, the pillar portions contacting with the second facing wall portion.

* * * * *